(12) United States Patent
Rendon

(10) Patent No.: US 11,639,424 B1
(45) Date of Patent: May 2, 2023

(54) PROCESS OF TRANSFORMING A PLASTIC EXTRUSION SYSTEM INTO A DYNAMIC DEPOLYMERIZATION

(71) Applicant: Timeplast, LLC, Coral Gables, FL (US)

(72) Inventor: Manuel Rendon, Winter Springs, FL (US)

( * ) Notice: Subject to any disclaimer, the term of this patent is extended or adjusted under 35 U.S.C. 154(b) by 1 day.

(21) Appl. No.: 17/505,211

(22) Filed: Oct. 19, 2021

Related U.S. Application Data

(62) Division of application No. 16/986,008, filed on Aug. 5, 2020, now Pat. No. 11,180,618.

(51) Int. Cl.
| | |
|---|---|
| *C08J 3/22* | (2006.01) |
| *B29C 35/08* | (2006.01) |
| *C08J 7/12* | (2006.01) |
| *B29C 48/285* | (2019.01) |
| *B29C 48/00* | (2019.01) |

(52) U.S. Cl.
CPC ........... *C08J 3/226* (2013.01); *B29C 35/0805* (2013.01); *B29C 48/022* (2019.02); *B29C 48/297* (2019.02); *C08J 7/123* (2013.01); *B29C 2035/0838* (2013.01); *C08J 2491/00* (2013.01); *C08J 2491/06* (2013.01)

(58) Field of Classification Search
CPC ........ C08J 3/226; C08J 7/123; C08J 2491/00; C08J 2491/06; B29C 35/0805; B29C 48/022; B29C 48/297; B29C 2035/0838
See application file for complete search history.

(56) References Cited

U.S. PATENT DOCUMENTS

| | | | | |
|---|---|---|---|---|
| 5,198,471 | A | * | 3/1993 | Nauman ................. B29B 17/02 521/46.5 |
| 6,638,589 | B1 | | 10/2003 | Järvenkylä |
| 9,114,562 | B2 | | 8/2015 | Venegoni |
| 2003/0146547 | A1 | * | 8/2003 | Fischer .................... C08J 11/08 264/340 |

* cited by examiner

*Primary Examiner* — Andrew J. Oyer
(74) *Attorney, Agent, or Firm* — Sanchelima & Associates, P.A.; Christian Sanchelima; Jesus Sanchelima

(57) ABSTRACT

An extrusion process of a manufacturing system for plastic which also serves as a depolymerization reactor through the use of melting point's temperature as activation energy and liquid solvents. The melting point activation energy and liquid solvents are used to generate a certain level of depolymerization at the manufacturing process of any given plastic product. The process includes several variables that are used in determining a final additive that is introduced at the beginning of the extrusion process. The final additive includes a mixture of a liquid solvents, a molecular filler, chemical carriers, and stabilizers.

9 Claims, 3 Drawing Sheets

| Variable | Divergence | Selection Value |
|---|---|---|
| 22 | Single | 2 |
|  | Double | 3 |
|  | Triple | 5 |
| 24 | Thermoforming | 2 |
|  | Injection Mould | 5 |
|  | Blow Mould | 6 |
| 62 | Linear | 1 |
|  | Branched | 2 |
|  | Cross-Linked | 4 |
| 64 | <125C | 0 |
|  | 125C<T<268C | 1 |
|  | 268C<T<327C | 3 |
| 66 | Low | 1 |
|  | Medium | 3 |
|  | High | 4 |
| 68 | Low | 2 |
|  | Medium | 4 |
|  | High | 8 |

FIG. 2

| Overarching Process Identification = OPI |
|---|
| All selected values in variable divergence must be added to calculate OPI, then = <br><br> If OPI = 8 < OPI ≤ 17, Then OPI Type A <br> If OPI = 17 < OPI ≤ 24, Then OPI Type B <br> If OPI = 24 < OPI ≤ 30, Then OPI Type C |
| Formula for Type A = 21.2% G + 14.6% I + 11.8% J + 52.4 H <br>                               42        44        48       46 <br><br> Formula for Type B = 27.3% G + 14.6% I + 13.3% J + 44.8 H <br>                               42        44        48       46 <br><br> Formula for Type C = 33.7% G + 14.6% I + 16.4% J + 35.3 H <br>                               42        44        48       46 |

FIG. 3

PROCESS OF TRANSFORMING A PLASTIC EXTRUSION SYSTEM INTO A DYNAMIC DEPOLYMERIZATION

OTHER RELATED APPLICATIONS

The present application is a divisional of pending U.S. patent application Ser. No. 16/986,008 filed on Aug. 5, 2020, which is hereby incorporated by reference.

BACKGROUND OF THE INVENTION

1. Field of the Invention

The present invention relates to a dynamic depolymerization process and, more particularly, to an extrusion process which also serves as a depolymerization reactor that uses the melting point's temperature as activation energy and liquid solvents.

2. Description of the Related Art

Several designs for a depolymerization process have been designed in the past. None of them, however, include the double use of any typical plastic goods production line's extrusion process of a manufacturing system for commercial plastic, that also serves concomitantly and on-the-go, as a dynamic depolymerization reactor through the use of its melting point's temperature as the activation energy for the chemical reaction and liquid solvents. The melting point activation energy and liquid solvents are used to generate a certain level of depolymerization at the manufacturing process of any given plastic product. The process includes several variables such as, the length to diameter ratio of the extrusion screw, heat signatures from the plastic feeder point to the point in which plastic reaches room temperature, and total residence time under heat. The variables further include, type of polymer chain, other polymeric additives used in the extrusion process, and the type of forming process. The variables will result in a selection of a value which will identify the dynamic type of overall plastic depolymerization subject of each version of the additive of the present invention.

Applicant believes that a related reference corresponds to U.S. Pat. No. 6,638,589 issued for a method and apparatus for using recycled plastic material and a plastic product produced by an extruder. Applicant believes that another related reference corresponds to U.S. Pat. No. 9,114,562 issued for a foamed polyester extrusion process and equipment that can be used in plants for producing sheets, boards or tubes of foamed polyester. However, the cited references differ from the present invention because they fail to address the issue of providing a second concomitant use to an extrusion process which also serves as a depolymerization reactor at the manufacturing process of any given plastic product. The process includes several variables that are used in determining a final additive to be fed through the extrusion machine in combination with plastic fed through the extrusion machine. This additive contains a mixture of a liquid solvent, a molecular filler, stabilizers, and a carrier selection.

Other documents describing the closest subject matter provide for a number of more or less complicated features that fail to solve the problem of plastic's unsustainability through its overengineering in an efficient and economical way. None of these patents suggest the novel features of the present invention, nor the reengineered pre-upcycled final plastic as the useful outcome.

SUMMARY OF THE INVENTION

It is one of the objects of the present invention to transform an extrusion process into a dynamic depolymerization reactor that corrects the over-engineering factor of plastic from its initial manufacturing stage.

It is another object of this invention to provide a data acquisition process that combines information into an algorithm, that makes possible to adapt this novel system to any extrusion process transforming said extrusion process into a depolymerization reactor that improves the circularity of polymers, both in terms of recyclability potential and microfragmentation potential in natural environments of a plastic material.

It is still another object of the present invention to provide an extrusion process with a depolymerization reactor that includes a liquid solvent(s) additive that reduces the energy required to extrude in a system.

It is yet another object of the present invention to provide an extrusion process with a depolymerization reactor that includes a liquid solvent(s) that is phased evaporated or phased out before the plastic reaches its manufacturing end point.

It is yet another object of the present invention to provide an extrusion process with a depolymerization reactor that produces a plastic with a lower molecular weight and half of the black specks after recycling.

It is yet another object of this invention to provide such a device that is inexpensive to implement and maintain while retaining nominal variables of the industry and its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows a chart with selection values for the divergence and definition of the algorithm, incorporating various variables in accordance to an embodiment of the present invention.

FIG. 3 illustrates another chart depicting the finite number of potential outcomes of the algorithm as ranges of an overarching process identification to determine the formula to be used for a final additive.

DETAILED DESCRIPTION OF THE EMBODIMENTS OF THE INVENTION

Figure 1:
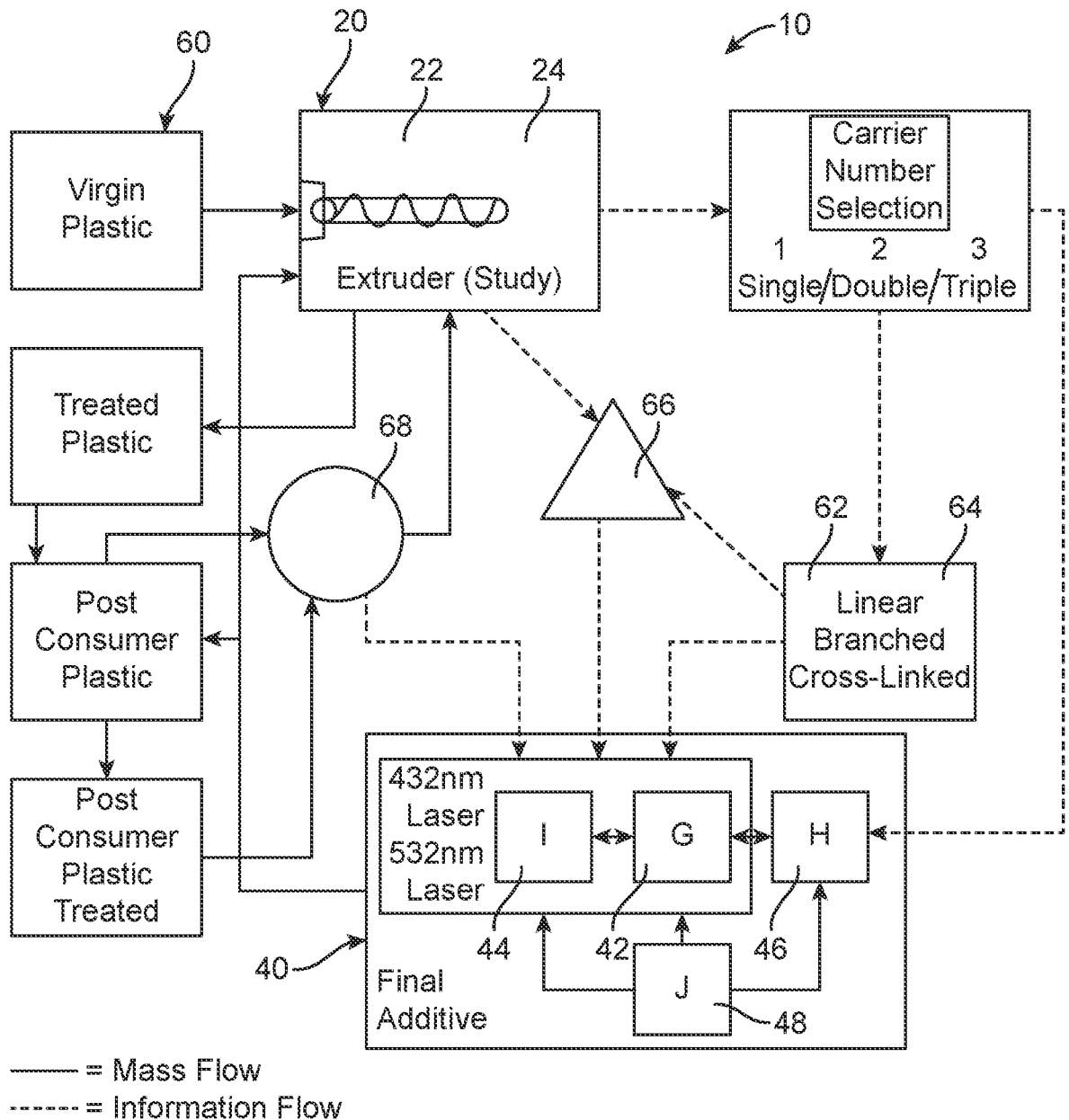
FIG. 1 represents the algorithm as a flow chart of an extrusion process with a depolymerization reactor 10 depicting several variables used in the extrusion process.

Referring now to the drawings, where the present invention is generally referred to with numeral 10, it can be observed an extrusion process with a depolymerization reactor 10 which basically includes an extruder 20, a final additive 40, and plastic 60.

Extruder 20 includes various variables that are used in determining the final additive 40 to be included in the extrusion process. Extruder 20 includes an extrusion screw geometry 22 having a ratio of length to diameter. The extruder further includes heat signatures 24 of the forming process produced through injection molding, blow molding, or thermoforming. The selection of these variables is determined by a company desiring to manufacture a plastic and the type of plastic they would like to manufacture.

Final additive 40 includes a liquid solvent 42 that is introduced into extruder 20. In the present invention, the extrusion process also serves as a depolymerization reactor by utilizing melting point's temperature as the activation energy and liquid solvents 42. Liquid solvents 42 in combination with the energy of the manufacturing extrusion process generate a certain level of depolymerization in order to correct the over-engineering factor of plastic. In the present embodiment, liquid solvents 42 is a mixture of at least three solvents (33% of each solvent) known in the art that is determined by the type of plastic that is being produced through the extrusion process. In one implementation, with regards to polyethylene terephthalate (PET), a solvent mixture of four-chlorophenol, benzyl alcohol, and NaOH in Ethylene Glycol is introduced. In another implementation, regards to polypropylene (PP), a solvent mixture of phthalic anhydride, petrolatum, and peanut oil is introduced. In yet another implementation, with regards to polyethylene (PE), a solvent mixture of heptane, benzyl alcohol, and amyl chloride is introduced.

In yet another implementation, with regards to polystyrene (PS), a solvent mixture of acetone, amyl chloride, and cedarwood oil is introduced. In yet another implementation, with regards to acrylonitrile butadiene styrene (ABS), a solvent mixture of citric oil/peppermint/pine oil, acetone, and amyl chloride is introduced. In yet another implementation, regarding post-consumer recycled plastic (PCR), a solvent mixture of acetone, amines, and acetate solvent, is introduced.

The solvents provided are known in the art. However, when introduced to the extrusion process, they facilitate a level of depolymerization that allows for the production of a superior plastic. Liquid solvents 42 are introduced into extruder 20 to facilitate depolymerization. Liquid solvents 42 also reduces the energy required to extrude in the extrusion process, thereby saving energy in the manufacturing process.

Final additive further includes a molecular filler 44 in the form of a solid wax-like element that is mixed with liquid solvents 42. Molecular filler 44 is maintains the quality of the plastic through the depolymerization process. Molecular filler 44 serves as a bridge between the upcycled monomers obtained through the in-manufacturing depolymerization that is still attached to a polymer chain and the wax-like materials added in the process as an additive.

In one embodiment, with regards to PET as described above, a molecular filler 44 of terephthalic acid is introduced. Additionally, with regards to PP, PS, ABS, and PRC, a molecular filler 42 of paraffin wax is introduced. Lastly, with regards to the PE, a molecular filler 42 of polyethylene wax is introduced.

The use of liquid solvents 42 may have a negative effect in plastics that come into contact with food. To overcome this issue, we program liquid solvents 42 to phase out completely by including a chemical carrier 46 into final additive 40 to protect the depolymerization process for a given period of time. Chemical carrier 46 will aid the plastic in homogenously distributing the heat and energy from the extrusion process in a way such that 100% of the liquid solvent 42 is evaporated or phased out before the plastic reaches its manufacturing end point and during its extrusion residence time. The extrusion process also aids with this through the constant stirring of the extrusion screw. As a result, the total time per application and manufacturing system, in which the plastic is receiving energy in the form of heat and pressure is calculated. This calculation is then used to determine the final total level of liquid solvents 42 in final additive 40 which will be reduced to zero in terms of the amount of liquid solvents 42 in the final plastic. In one embodiment, chemical carrier 46 is provided as a bio based or plant-based oil that is specifically selected for its compatibility with the particular heat signatures 24 of the manufacturing process. As a result, the extrusion temperature doesn't surpass the ability of the oil to do its purpose before fuming or phasing out. Each plastic application in the extrusion process of the present invention will have its own chemical carrier 46 tailored specifically for each particular case. Chemical carrier 46 may include a selection or combination of palm oil, soybean oil, or dioctyl terephthalate.

The chemical carrier 46 is determined by the extrusion screw geometry 24. The length to diameter ratio of the extrusion screw geometry is directly proportional to the output and melt temperature in the extrusion process. Chemical carrier 46 must be selected to fulfill its purpose based on the output and melt temperature. Higher temperatures increase the amount of energy the chemical reaction receives. Therefore, the entire composition of the additive must withstand such temperature without fuming or phasing out. The higher the length to diameter ratio, the more carries are needed to aid in the extrusion process. In one embodiment, in a length to diameter ratio of 20:1 and 24:1 a single carrier will be selected to perform optimally in at a melting zone. This single carrier may consist of 100% of either palm oil or dioctyl terephthalate. In another embodiment, in a length to diameter ratio of 25:1 two carriers will be used. A main carrier that is designed to perform optimally in the melting zone and a secondary carrier to be selected to perform optimally in a compression zone of the extrusion process. The two carriers consist of 50% soybean oil and 50% dioctyl terephthalate. In yet another embodiment, in a length to diameter ratio of 30:1, there will be selected two carriers as described for the length to diameter ratio of 25:1. A third carrier were then be selected to perform optimally at a feed zone of the extrusion process. The triple carrier may consist of 33.3% palm oil, 33.3% soybean oil, and 33.3% of dioctyl terephthalate.

Final additive 40 may also include a stabilizer 48 ranging from surfactants, silicas, and UV stabilizers to aid the in the depolymerization process.

In the present invention, plastic 60 may be provided in the form of virgin plastic that is fed through extruder 20. Plastic 60 also includes several variables that go into determining final additive 40. Plastic 60 includes a type of polymer chain 62 ranging from linear, branched, and cross linked. Plastic 60 also includes a melting point 64 ranging from temperatures: less than 125 degrees Celsius, less than 268 but greater than 125 degrees Celsius, and less than 327 but greater than 268 degree Celsius. Plastic 60 may further be provided from in house recycling 66 and outsourced recycling 68.

The extrusion process with a depolymerization reactor 10 includes a first step. In this first step, each of the variables for extruder 20 and plastic 50 will result in a selection value which will identify the mixture of final additive to be introduced in the extrusion process. The selection value represents the energy that the extrusion process receives, the selection values are then added to determine the amount of energy that is received in the extrusion process. It is observed in FIG. 2, a chart containing selection values for the various divergence of several variables described in this specification. Once the divergence for each variable is identified, the selection values are added to determine an overarching process identification value which represents a total amount of energy in the extrusion process concluding the first step.

The extrusion process with a depolymerization reactor 10 further includes a second step. In this second step, final additive 40 is mixed into extruder 50 to generate a depolymerization reaction. The final additive includes a combination of a liquid solvent 42, a molecular filler 44, a chemical carrier 46 and a stabilizer. The percentages of this combination are determined by the overarching process identification value calculated in the first step. It can be observed in FIG. 3, a chart depicting various ranges of the overarching process identification value. If the value falls within a specific range, a certain type of formula for final additive 40 is used. The present embodiment discloses three ranges for the overarching process identification value; however, it should be understood, that further ranges and further formulas may be included. In one example, if the overarching process identification value is less than or equal to 17 but greater than 8, then a "Type A" formula is utilized. The "Type A" formula consists of 21.2% of liquid solvent 42, 14.6% of molecular filler 44, 11.8% of stabilizer 48, and 52.4% of chemical carrier 46. This formula provides the appropriate final additive which generates the most effective depolymerization reaction. FIG. 3 goes on to depict other ranges with their appropriate formula for final additive 40. Variables are calculated and combined to determine one of three categories that will be used to create the composition used to make a dynamic depolymerization reactor. The variable and their calculations can be found below:

a) Calculate a first variable by first determining the extrusion screw length-to-diameter ratio. A ratio of 20:1 or 24:1 defines a single carrier category; 25:1 defines a double carrier category; and 30:1 defines a triple carrier category. A different chemical/element or combination or chemicals/elements are assigned per category. A single carrier category is assigned either palm oil, soybean oil, or DOTP (Dioctyl terephthalate). A double carrier category is assigned a combination of 50% soybean oil and 50% DOTP. A triple carrier category is assigned a combination of ⅓palm oil, ⅓DOTP, and ⅓soybean oil.

b) Calculate a second variable based on the type of polymer chain. Three polymer categories are used for this depending on melting point. A polymer having a melting point lower than 125 degrees Celsius defines a first polymer category and given a value of 0. A polymer having a melting point between 125-268 degrees Celsius defines a second polymer category and is given a value of 1. A polymer having a melting point between 268-327 degrees Celsius defines a third polymer category and given a value of 3.

Calculate a third variable based on whether the polymer chain is linear, branched, or cross-linked. A linear polymer chain is assigned a value of 1, a branched polymer chain is assigned a value of 2, and a cross-linked polymer chain is assigned a value of 4.

c) Calculate a fourth variable named the in-house recycling variable. Three categories are used, a low, medium or high in-house recycling category. If the production recycled is between 0-5% a low in-house recycling category is assigned. If the production recycled is between 5-20% a medium in-house recycling category is assigned. If the amount of production recycled is above 20% a high in-house recycling category is assigned. A low category is assigned a value of 1, a medium category is assigned a value of 3, and a high category is assigned a value of 4.

d) Calculate a fifth variable categorized as a low outsource recycling category defined as 0-25% of total production, a medium outsource recycling category defined as 25-50% of total production, a high outsource recycling category defined as above 50% of total production. The low outsource recycling category is assigned a value of 2, the medium outsource recycling category is assigned a value of 4, and the high outsource recycling category is assigned a value of 8.

e) Calculate a sixth variable based on the molecular filler of a given plastic. A PET category is assigned a TPA wax molecular filler, a polypropylene category is assigned a paraffin wax molecular filler, a polyethylene category that is assigned a polyethylene wax molecular filler, and a fourth category that includes either polystyrene, ABS, PVC and is assigned a paraffin wax molecular filler.

f) Calculate a seventh variable being a solvent based on the kind of polymer used. Each solvent is a combination of elements/chemicals in equal ⅓parts. Polyethylene terephthalate (PET) is assigned a) 4-chlorophenol, b) benzyl alcohol, and c) NaOH in Ethylene Glycol (50/50). Polypropylene (PP) is assigned a) phthalic anhydride, b) petrolatum, and c) peanut oil. Polyethylene (PE) is assigned a) heptane, b) benzyl alcohol, and c) amyl chloride. Polystyrene (PS) is assigned a) acetone, amyl chloride, and c) cedarwood oil. Acrylonitrile butadiene styrene (ABS) is assigned a) citric oil/peppermint/pine oil, b) acetone, and c) amyl chloride. Polyvinyl chloride (PVC) is assigned a) acetone, b) amines, and c) acetate solvent.

g) Calculate an eighth variable based on the type of stabilizer used. Three stabilizers are used in varying proportions. The three stabilizers are surfactant between 50-90% by weight, fumed silica between 9-40% by weight, and a UV stabilizer between 1-10% by weight.

h) Calculate a ninth variable based on three types of forming processes. Thermal forming is given a selection value of 2, injection molding is given a selection value of 5, and blow molding is given a selection value of 6.

Once these variables are calculated they are then used together. First, the selection values are added and if their summation is between 8 and less than or equal to 17 it is assigned to an Overarching Process Identification (OPI) of Type A. If their summation is greater than 17 and less than or equal to 24 it is assigned to OPI Type B. If their summation is greater than 24 it is assigned to OPI Type C. Each Type is assigned a composition make-up. The preferred percentage is disclosed and the effective ranges are in parenthesis. All percentages are by weight. OPI Type A is assigned 21.2% (15-20%) of the selected solvent, 14.6% (5-40%) of the molecular filler chosen based on the calculation of the sixth variable, 11.8% (5-25%) of the stabilizer in an effective proportion of each, and 52.4% (10-75%) of the carrier selected based on the calculation of the first variable. OPI Type B is assigned 27.3% (20-30%) of the selected solvent, 14.6% (10-40%) of the molecular filler chosen based on the calculation of the sixth variable, 13.3% (10-20%) of the stabilizer in an effective proportion of each, and 44.8% (10-60%) of the carrier selected based on the calculation of the first variable. OPI Type C is assigned 33.7% (25-35%) of the selected solvent, 14.6% (14-40%) of the molecular filler chosen based on the calculation of the sixth variable, 16.4% (10-20%) of the stabilizer in an effective proportion of each, and 35.3% (5-50%) of the carrier selected based on the calculation of the first variable. OPI stands for overarching process identification.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for transforming a plastic extrusion process into a dynamic depolymerization reactor, comprising:
   a) mixing a molecular filler and a solvent using lasers and mechanical agitation;
   b) once the molecular filler and said solvent are mixed a resulting mixture is combined with a carrier and a stabilizer using high speed sheer to create a resulting liquid; and
   c) said resulting liquid is delivered between a mount and a feed zone of an extrusion screw.

2. The process of claim 1 wherein two lasers are used.

3. The process of claim 2 wherein the first laser has a wavelength of 432 nm and a second laser has a wavelength of 532 nm.

4. A process for transforming a plastic extrusion process into a dynamic depolymerization reactor, comprising:
   a) Calculate a first variable by first determining the extrusion screw length to diameter ratio 20:1, 24:1 defines a single carrier category, 25:1 defines a double carrier category, and 30:1 defines a triple carrier category, determining which one of said carrier category said extrusion screw falls into; assign a chemical per category, single carrier is assigned a first chemical, said first chemical is either entirely palm oil, entirely soybean oil, or entirely DOTP; if a double carrier is selected then a second chemical is assigned to it comprised of 50% soybean oil and 50% DOTP; if a triple carrier is selected then a third chemical is assigned comprising one-third palm oil, one-third DOTP, and one-third soybean oil;
   b) Calculate a second variable based on the type of polymer chain out of three polymer categories depending on melting point, polymer having a melting point lower than 125 degrees Celsius defines a first polymer category and given a value of 0, polymer having a melting point between 125-268 degrees Celsius defines a second polymer category and given a value of 1, polymer having a melting point between 268-327 degrees Celsius defines a third polymer category and given a value of 3;
   c) Calculate a third variable based on whether the polymer chain is linear, branched, or cross-linked, linear is assigned a value of 1, branched is assigned a value of 2, and cross-linked is assigned a value of 4;
   d) Calculate a fourth variable named the in-house recycling variable, said fourth variable can fall into either a low, medium or high in-house recycling category, 0-5% of production recycled is low, 5-20% of production recycled is medium, and above 20% of production recycled is high; low category is assigned a value of 1, medium category is assigned a value of 3, and high category is assigned a value of 4;
   e) Calculate a fifth variable categorized as a low outsource recycling category defined as 0-25% of total production, a medium outsource recycling category defined as 25-50% of total production, a high outsource recycling category defined as above 50% of total production, said low outsource recycling category is assigned a value of 2, said medium outsource recycling category is assigned a value of 4, said high outsource recycling category is assigned a value of 8;
   f) Calculate a sixth variable based on the molecular filler of a given plastic, a PET category that is assigned a TPA wax molecular filler, a polypropylene category that is assigned a paraffin wax molecular filler, a polyethylene category that is assigned a polyethylene wax molecular filler, and a fourth category that includes either polystyrene, ABS, PVC that is assigned a paraffin wax molecular filler;
   g) Calculate a seventh variable being a solvent based on the kind of polymer used, each of said solvent is a combination of elements/chemicals in equal ⅓ parts, Polyethylene terephthalate (PET) is assigned a) 4-chlorophenol, b) benzyl alcohol, and c) NaOH in Ethylene Glycol (50/50), Polypropylene (PP) is assigned a) phthalic anhydride, b) petrolatum, and c) peanut oil, Polyethylene (PE) is assigned a) heptane, b) benzyl alcohol, and c) amyl chloride, Polystyrene (PS) is assigned a) acetone, amyl chloride, and c) cedarwood oil, Acrylonitrile butadiene styrene (ABS) is assigned a) citric oil/peppermint/pine oil, b) acetone, and c) amyl chloride, Polyvinyl chloride (PVC) is assigned a) acetone, b) amines, and c) acetate solvent;
   h) Calculate an eighth variable based on the type of stabilizer used, surfactant between 50-90% by weight, fumed silica between 9-40% by weight, and a UV stabilizer between 1-10% by weight;
   i) Calculate a ninth variable based on three types of forming processes, thermal forming is given a selection value of 2, injection molding is given a selection value of 5, and blow molding is given a selection value of 6;
   j) Adding selection values and if their summation is between 8 and less than or equal to 17 it is assigned to OPI Type A, if their summation is greater than 17 and less than or equal to 24 it is assigned to OPI Type B, if their summation is greater than 24 it is assigned to OPI Type C, each of said OPI Type is assigned a composition make-up, OPI Type A is assigned 15-20% of the selected solvent, 5-40% of the molecular filler chosen based on the calculation of the sixth variable, 5-25% of the stabilizer in an effective proportion of each, and 10-75% of the carrier selected based on the calculation of the first variable, OPI Type B is assigned 20-30% of the selected solvent, 10-40% of the molecular filler chosen based on the calculation of the sixth variable, 10-20% of the stabilizer in an effective proportion of each, and 10-60% of the carrier selected based on the calculation of the first variable, OPI Type C is assigned 25-35% of the selected solvent, 14-40% of the molecular filler chosen based on the calculation of the sixth variable, 10-20% of the stabilizer in an effective proportion of each, and 5-50% of the carrier selected based on the calculation of the first variable, all of the foregoing percentages being by weight;
   k) Creating a final additive based on the above calculations and categorization; and
   l) Mixing a virgin plastic with said final additive into an extruder of said plastic extrusion process, wherein said final additive generates a depolymerization reaction within said extrusion process, wherein said final additive includes a mixture of a liquid solvent, a molecular filler, a chemical carrier, and a stabilizer.

5. The process for transforming a plastic extrusion process into a depolymerization reactor of claim 4 wherein said total amount of energy is calculated by the addition of selections values assigned to a divergence of a variable.

6. The process for transforming a plastic extrusion process into a depolymerization reactor of claim 4 wherein said chemical carrier includes at least one of palm oil, soybean oil, or dioctyl terephthalate.

7. The process for transforming a plastic extrusion process into a depolymerization reactor of claim 4 wherein said stabilizer includes at least one of surfactants, silicas, and UV stabilizers.

8. The process for transforming a plastic extrusion process into a depolymerization reactor of claim 4 wherein said chemical carrier is one of a single carrier, a double carrier, or a triple carrier.

9. The process for transforming a plastic extrusion process into a depolymerization reactor of claim 8 wherein said chemical carrier is determined by a ratio of length to diameter of an extruder.

\* \* \* \* \*